United States Patent
Kuroiwa

(10) Patent No.: US 6,687,454 B1
(45) Date of Patent: Feb. 3, 2004

(54) AUDIO DATA AND STILL PICTURE RECORDING MEDIUM AND CORRESPONDING PLAYBACK APPARATUS WHICH ENABLE DISPLAYING OF A STILL PICTURE AT A PLURALITY OF PREDETERMINED TIMINGS DURING PLAYBACK OF RECORDED AUDIO DATA

(75) Inventor: Toshio Kuroiwa, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/307,722

(22) Filed: May 10, 1999

(30) Foreign Application Priority Data

Jun. 2, 1998 (JP) .......................................... 10-153401

(51) Int. Cl.[7] ............................................... H04N 5/91
(52) U.S. Cl. ......................... 386/96; 386/104; 386/124
(58) Field of Search .......................... 386/96, 83, 104, 386/124; H04N 5/91

(56) References Cited

U.S. PATENT DOCUMENTS

| | | | |
|---|---|---|---|
| 4,873,586 A | | 10/1989 | Ishikawa et al. |
| 5,555,098 A | * | 9/1996 | Parulski ...................... 386/104 |
| 5,570,340 A | | 10/1996 | Lee et al. |
| 5,680,500 A | * | 10/1997 | Takahashi et al. ............. 386/95 |
| 5,732,267 A | * | 3/1998 | Smith ............................ 713/1 |
| 5,812,736 A | * | 9/1998 | Anderson ..................... 386/96 |
| 5,822,492 A | * | 10/1998 | Wakui et al. ................ 386/107 |
| 5,895,123 A | * | 4/1999 | Fujii et al. ..................... 386/96 |
| 6,195,503 B1 | * | 2/2001 | Ikedo et al. ................. 386/104 |

FOREIGN PATENT DOCUMENTS

| | | |
|---|---|---|
| EP | 0465 244 | 1/1992 |
| JP | 5-282779 | 10/1993 |

* cited by examiner

*Primary Examiner*—Vincent Boccio
*Assistant Examiner*—James A Fletcher
(74) *Attorney, Agent, or Firm*—Louis Woo

(57) ABSTRACT

A recording medium such as a video CD, for recording both audio and still picture data, has all audio data recorded on successive tracks within one recording region and data of all of the still pictures recorded together within another recording region as successive data sets expressing respective ones of a plurality of groups of still pictures. Each of recorded sets of track control information specifies, for the corresponding track, a still picture group which includes all of the still pictures that are to be displayed during playback of that track, those pictures (within that group) which are actually to be displayed during that playback, and respective display starting time points for the specified pictures. The playback apparatus includes a still picture data memory, and a control section which, when playback of a selected track is designated, judges whether the data of the corresponding still picture group are already stored in the memory, reads out those data and stores in the memory if necessary, and thereafter reads out the requisite still picture data from memory as indicated by the track control information of the selected track during playback of that track.

3 Claims, 5 Drawing Sheets

FIG. 3

| TRACK CONTROL INFORMATION (TC) |
|---|
| STARTING POSITION OF TRACK |
| END POSITION OF TRACK |
| PLAYING DURATION OF TRACK |
| STARTING POSITION OF RECORDED STILL PICTURE DATA EXPRESSING THE STILL PICTURE GROUP CORRESPONDING TO THIS TRACK |
| END POSITION OF RECORDED STILL PICTURE DATA EXPRESSING THE STILL PICTURE GROUP CORRESPONDING TO THIS TRACK |
| NUMBER OF THE STILL PICTURE GROUP WHICH CORRESPONDS TO THIS TRACK =1 |
| STILL PICTURE DISPLAY INFORMATION |

| DISPLAY STARTING TIME POINT | STARTING POSITION OF RECORDED STILL PICTURE DATA | END POSITION OF RECORDED STILL PICTURE DATA | STILL PICTURE |
|---|---|---|---|
| =10 | =0 | =100 | STILL PICTURE NO.1 |
| =30 | =100 | =200 | STILL PICTURE NO.2 |
| =50 | =200 | =300 | STILL PICTURE NO.3 |
| =100 | =0 | =100 | STILL PICTURE NO.1 |
| =200 | =200 | =300 | STILL PICTURE NO.3 |

AUDIO DATA AND STILL PICTURE RECORDING MEDIUM AND CORRESPONDING PLAYBACK APPARATUS WHICH ENABLE DISPLAYING OF A STILL PICTURE AT A PLURALITY OF PREDETERMINED TIMINGS DURING PLAYBACK OF RECORDED AUDIO DATA

BACKGROUND OF THE INVENTION

1. Field of Technology

The present invention relates to a playback apparatus for playback of a recording medium having recorded thereon audio data and also still picture data expressing a plurality of still pictures, together with information specifying timings during playing of the audio data at which respective ones of the still pictures are to be displayed by the playback apparatus.

In particular, the invention relates to such a playback apparatus which is applicable to a recording medium consisting of an optical readout type of compact disk (CD) having still picture and audio data recorded thereon as a digital bit stream, with the data being recorded as a plurality of data portions referred to as tracks which are managed as separate units. It should be noted that the term "track" is used in the following description and in the appended claims only with the significance defined above.

2. Description of Prior Art

With a prior art type compact disk (generally referred to in the following as a CD) which is an optical recording disk that is utilized only for recording music, each of respective musical items that are recorded on the CD are managed in units of tracks, i.e., with the recorded audio data portion which expresses one musical item being recorded as one track, and with successive tracks being recorded sequentially in a recording region of the disk. In addition, such a CD has recorded thereon track control information (TC) which indicates the respective leading addresses, final addresses and playing durations, etc. for each of the tracks which are recorded on the disk, where the term "address" is used here to signify a position of recorded data on a CD, expressed for example as a sector number. The track control information is used by the playback apparatus for selecting a specific track to be played, in response to a user input command which specifies playing of that particular track.

In recent years it has become possible to record a substantial amount of digital data, e.g., 600 MB, on a CD having a diameter of 12 cm, of the type which has in the past been generally used for recording music. For that reason, such CDs have come into use as data storage devices of read-only type, referred to as CD-ROMs, for recording various types of digital data. In addition, CD-ROMs have come into use for recording music information together with other types of information, for example video CDs which have recorded thereon audio data and also still picture or video data, with resultant pictures being displayed at predetermined times during playback of the audio data. Such video CDs are applied to uses such as digital video karaoke, music videos, animated cartoons, language teaching materials, teaching materials for infants, etc., so that the applications of CDs have expanded into a wide range. In addition, DVDs (digital video disks), which are a type of video CD having very large storage capacity, have now been put into practical use.

In the case of video CDs which have a file structure that is based on the ISO 9660 standard, the disk has a lead-in region at the inner periphery of the disk, a lead-out region at the outer periphery of the disk, and the tracks are successively numbered from 1 to 99.

Data expressing a TOC (table of contents) is recorded in the lead-in region. The TOC contains information specifying various information that is necessary for playing selected tracks such as the starting addresses (i.e., the starting positions on the disk of each of the regions in which the respective tracks are recorded on the disk) etc., with the various tracks being assigned successive numbers. Track No. 1 (video CD track) has recorded therein various files for use in disk management, playback control data, still picture data, and an application program which is required for activating the operation of a CD-I player. Video/audio bit streams which have been subjected to MPEG 1 compression are recorded in each of the tracks numbered from 2 to 99. Information indicating termination of the program is recorded in the lead-out region.

With the widening of the range of applications of CDs which has occurred as described above, a type of playback apparatus is now in use for playing video CDs which have audio data and video data recorded thereon, with the audio data formed into a plurality of tracks and the video data expressing a plurality of still pictures which start to be displayed at respectively predetermined time points during playback of the audio tracks. With such a video CD, the respective sets of data expressing the still pictures are recorded within the audio data tracks, i.e. each track can contain one or more sets of still picture data together with the audio data. Approximately 10 to 20 still pictures can be recorded on each track, and respectively displayed at predetermined time points during playing of a track.

FIG. 5 is a diagram for use in describing the general arrangement of recorded data on such a prior art type of CD in which both audio data and still picture data can be recorded in each track, with the audio data and the sets of still picture data being recorded in succession within a track. Track control information sets TC1 to TC3 are recorded in the TOC region at the innermost periphery of the disk, and the data of tracks 1 to 3 are successively recorded following the track control information sets TC1 to TC3, i.e. in the recording region which succeeds that in which the track control data sets are recorded.

In FIG. 5, the track control information TC1 consists of control information formed of the leading address and final address of the data recorded on track 1, the playing duration of that track, etc. Similarly, the sets of track control information TC2 and TC3 respectively constitute control information formed of the leading address and final address on the disk, and the playing duration, for tracks 2 and 3. Each of the sets of data recorded on tracks 1 to 3 is formed as a plurality of still picture/audio data blocks, with the internal configuration of such a block being shown in FIG. 5 for the case of track 1. Such a still picture/audio data block contains all of the data expressing one still picture, with the data being divided into a plurality of segments as shown, so that the block is formed of a plurality of segments of the data expressing that still picture, alternating with portions of the audio data of that block. During playing of the track containing such a block, the successive still picture data segments are sequentially read out from the recording medium and are stored in a memory. When all of these data segments have been stored, they are combined into a single data set, which is then decoded to generate a video signal expressing the corresponding still picture, which can thereby be displayed.

It can thus be understood that with such a method, by making each of the plurality of still picture data segments within each still picture/audio data block sufficiently short, periods of discontinuity in audio playback which result from reading out of still picture data from the recording medium can be made correspondingly short, so that effectively continuous playback of the audio data of a track can be achieved.

However with a prior art type of optical recording disk having the data recording arrangement described above, the timings at which the respective still pictures expressed by the sets of still picture data recorded in a track are displayed, during playing of the audio data of that track, are fixedly determined by the arrangement of data on the disk, i.e., by the respectively positions at which the sets of still picture data are located within each track. This can result in delays occurring in playing of the audio data, due to time required to execute disk control operations relating to the still picture data. Furthermore when the recorded data are arranged on the disk in such a way, then in the production of such optical recording disks, if it should become necessary to rearrange or delete any of the still picture data after the data arrangement on the disk has been completed, complex data processing operations must be repetitively performed.

A further disadvantage is that, if the same still picture is to be displayed a number of times within the playing of one track or is to be displayed in each of a plurality of tracks, then the data of that still picture must be recorded a corresponding number of times in accordance with the respective timings at which the still picture is to be displayed. This is a significant disadvantage, since such recording of multiple copies of each of one or more still pictures on an optical recording disk may substantially reduce the proportion of the overall capacity on the disk that is available for recording of audio data.

SUMMARY OF THE INVENTION

It is an objective of the present invention to overcome the problems of the prior art described above by providing a playback apparatus and a corresponding recording medium whereby the playback apparatus can display any still picture that is expressed by a still picture data set which is recorded on the recording medium, at each of a plurality of timings which are specified by information recorded on the recording medium, during playback of audio data that are recorded on the recording medium, without the need to record such a still picture data set a corresponding plurality of times.

More specifically, a playback apparatus according to the present invention is adapted to execute playback of a recording medium having an audio data recording region in which are recorded all of respective audio data sets constituting a plurality of tracks, a still picture data recording region in which are recorded data expressing one or more groups of still pictures, with each group including all of a set of still pictures that are to be displayed during playback of the audio data of a track, and a track control information recording region having recorded therein respectively separate sets of track control information for each of the tracks. Each such set of track control information for a track includes, in addition to information for specifying the respective positions at which the tracks are recorded on the recording medium and the playing durations of the tracks:

(a) information which identifies a specific one of the aforementioned groups (i.e., a still picture group containing all of the still pictures that are to be displayed during playing of the audio data of that track) and specifies the range (i.e., initial address and final address) of the region in which the data of that group of still pictures are recorded on the recording medium, (b) information for individually identifying those still pictures (within the specified group), which are to be displayed during playing of that track, and respective positions of the data sets expressing these still pictures, within the data expressing the specified group, and (c) information for specifying the respective time points at which displaying of each of the identified still pictures is to begin, with reference to the commencement of playback of the audio data of that track.

When a track of the recording medium is selected to be played (i.e., by an input command supplied to the playback apparatus by a user), the video data of the still picture group that is specified as corresponding to the selected track by the corresponding track control information set are read out from the recording medium and stored in a memory. Readout of the audio data of the selected track then begins, and the sets of video data expressing respective ones of the still pictures that are to be displayed during playback of that track are thereafter read out from the memory at timings which are specified by the track control information.

As a result, if it should become necessary during the production of such a recording medium to alter the arrangement of still picture data on the recording medium or to delete any of the still picture data, after layout of data on the recording medium has been completed, such rearrangement or deletion of data can easily be performed without the need to execute complex data processing operations.

In addition, if it is required to display a still picture a plurality of times during playing of a specific track (i.e., a still picture which is included in the group of still pictures predetermined as corresponding to that track) then such operation can be specified in the track control information of that track, without the need to record multiple copies of the data of such a still picture on the recording medium.

Similarly, if it is required to display each of a specific set of one or more still pictures during playback of the audio data of each of a plurality of tracks, then this can be achieved by recording the data of a single still picture group which contains all of that set of still pictures, and which is specified as corresponding to each of that plurality of tracks (i.e., which is identified within the respective track control information sets of that plurality of tracks). Here again, recording of multiple copies of the data of such still pictures on the recording medium is made unnecessary.

Furthermore, after playback of a selected track has been completed, the still picture data of the still picture group corresponding to that track are left stored in the still picture data memory during any subsequent playing of other tracks of the recording medium. When playback of a selected track is to be executed, the still picture group which is identifed in the track control information set of the selected track is first compared with the contents of the still picture data memory, to find if the data of that still picture group have already been stored in the still picture data memory. If so, then such data are read out from the memory and utilized, without requiring any operation for storing such still picture data in the memory to be executed at that time. This serves to reduce any occurrence of discontinuity in the output audio signal which is obtained from playback of successively selected tracks.

BRIEF DESCRIPTION OF THE DRAWINGS

FIG. 3 is a diagram showing an example of the contents of one of a plurality of sets of track control information shown in FIG. 2, corresponding to a specific one of the tracks.

DESCRIPTION OF PREFERRED EMBODIMENTS

Figure 1:
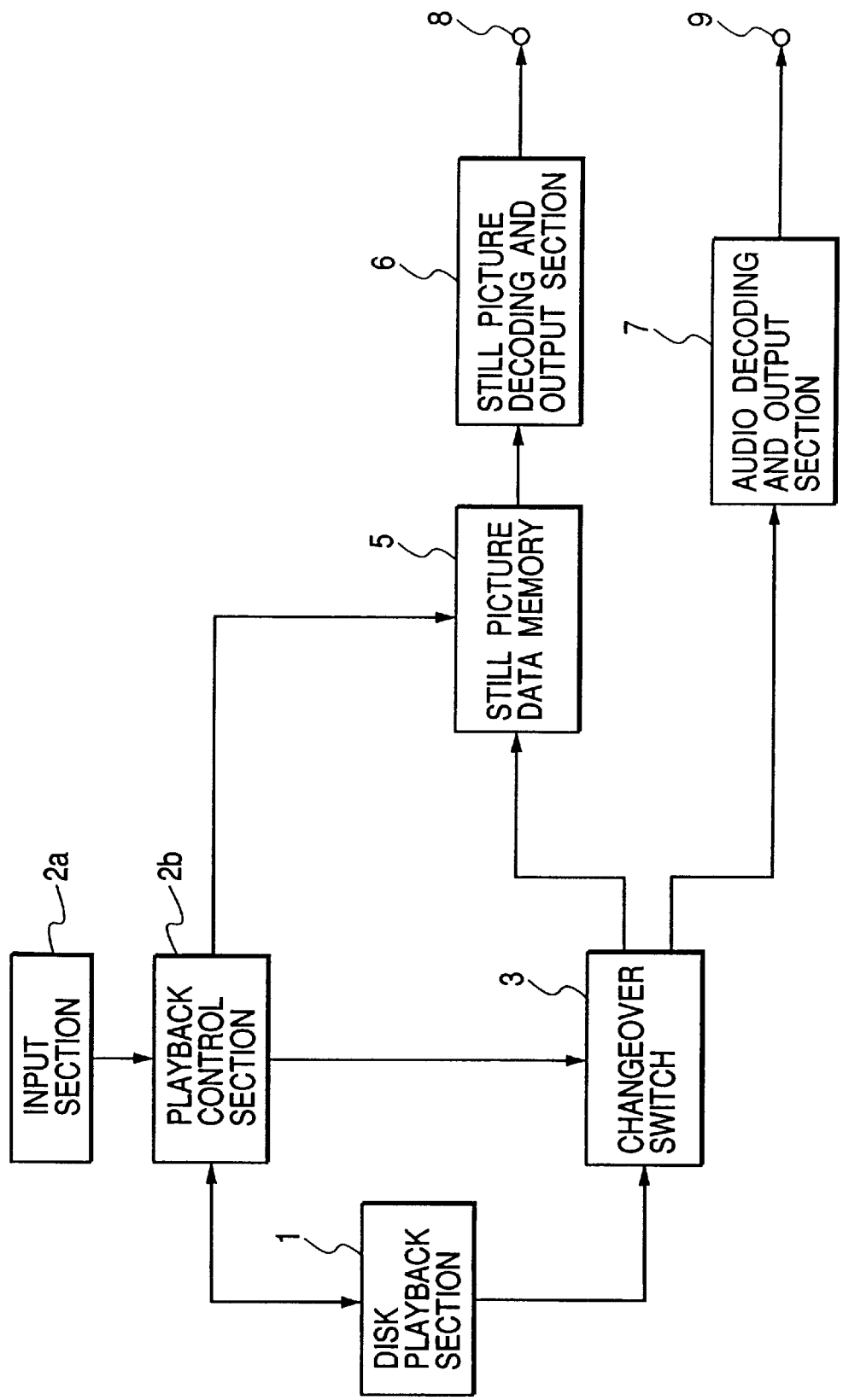
FIG. 1 is a general system block diagram of an embodiment of a playback apparatus according to the present invention.
Figure 2:
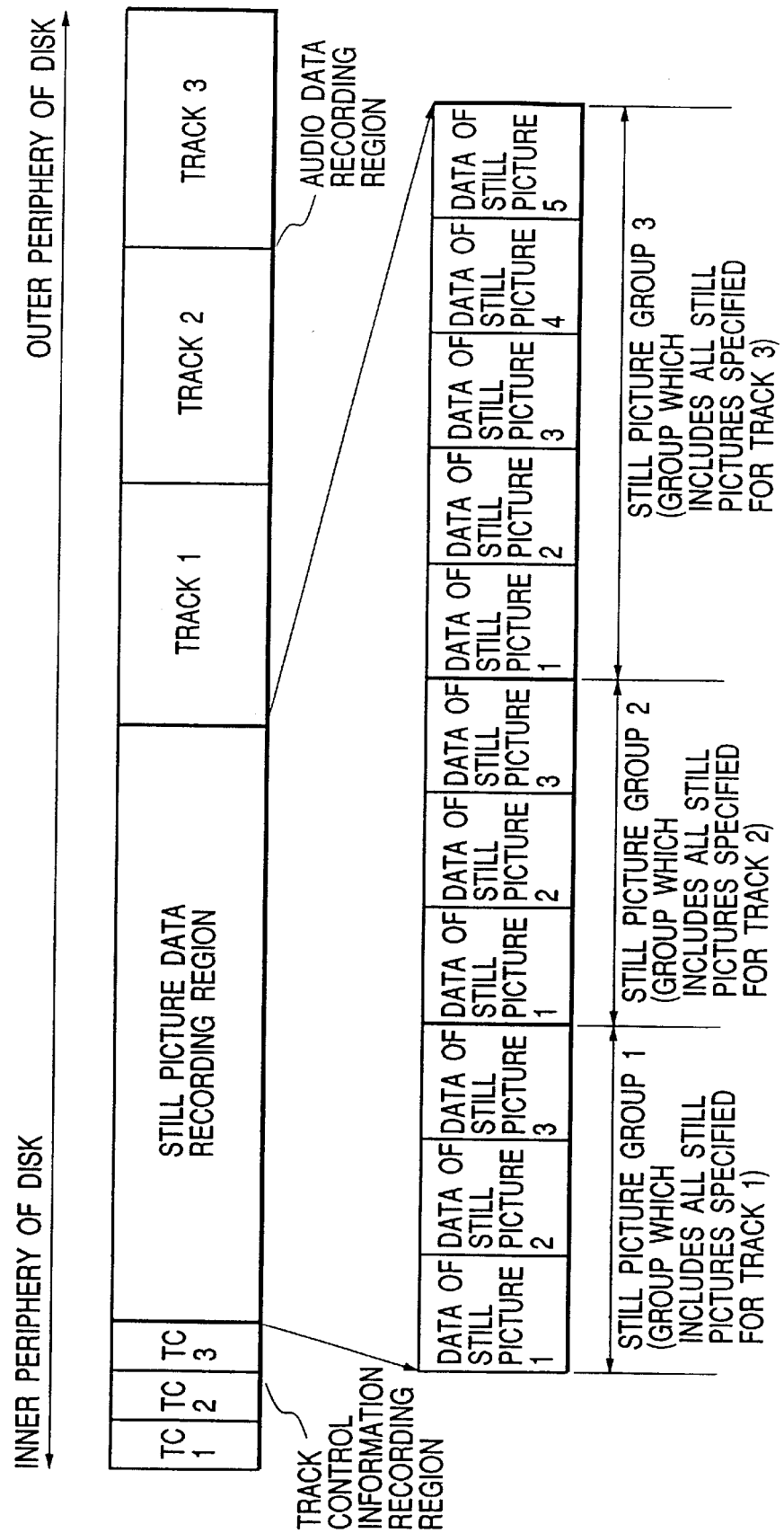
FIG. 2 is a conceptual diagram showing an example of arrangement of track control information, still picture data and tracks containing audio data, on a recording disk for still picture data and audio data according to the present invention.
Figure 4:
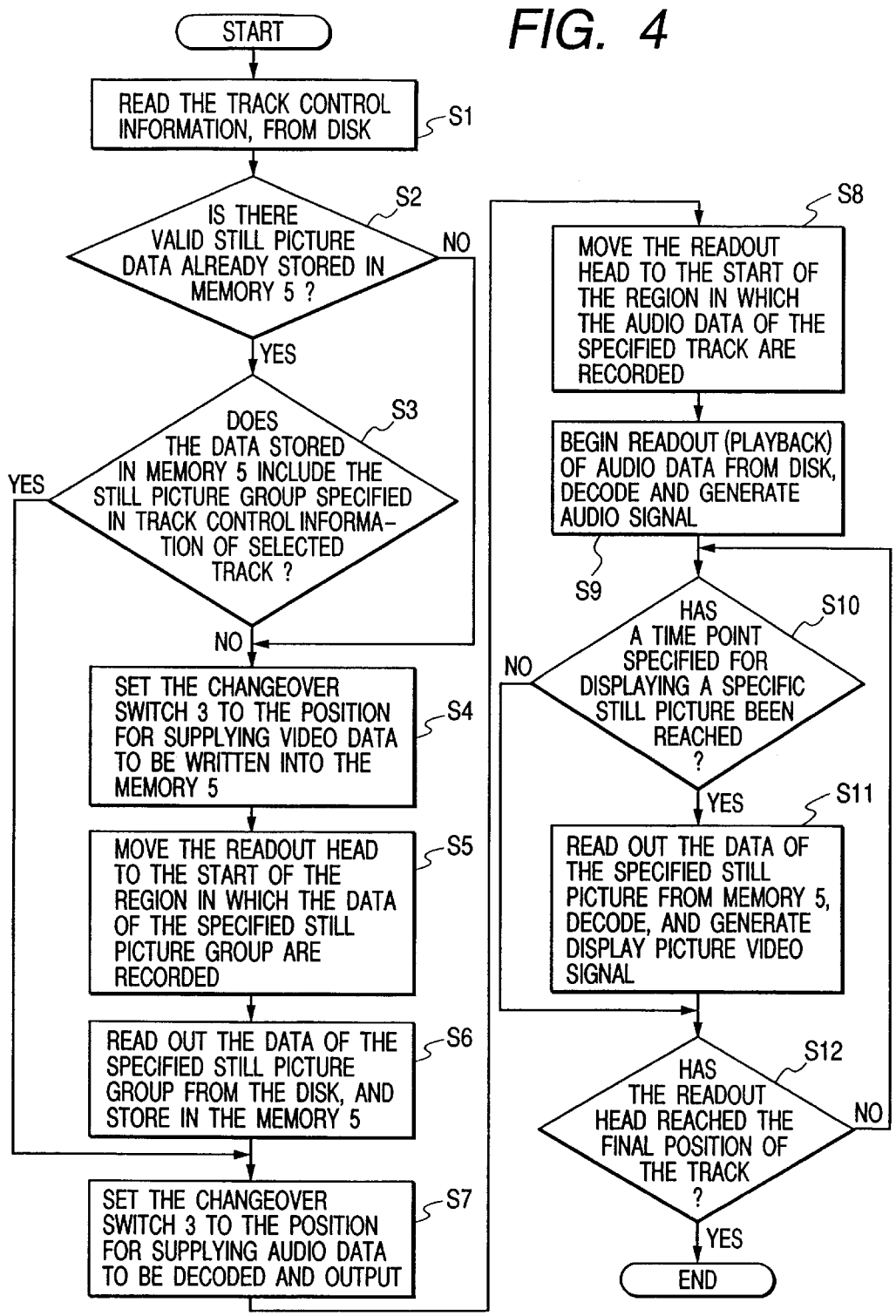
FIG. 4 is a flow diagram for use in describing the operation of the embodiment of FIG. 1.
Figure 5:
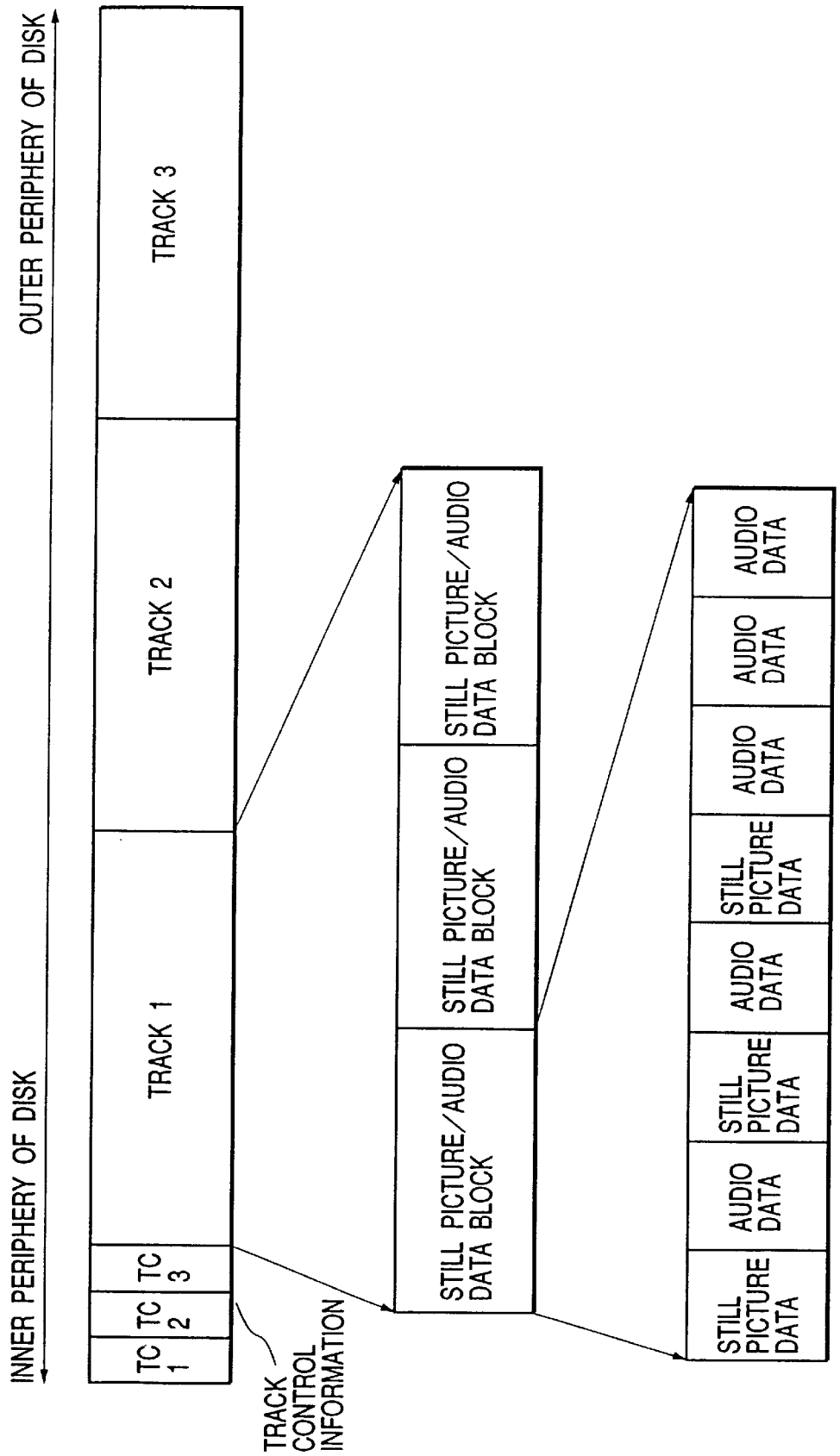
FIG. 5 is a conceptual diagram showing an example of arrangement of data on a prior art type of optical recording disk for still picture data and audio data, in which each of a plurality of tracks is formed of a plurality of data blocks, with each block consisting of segments of the data of a single still picture, alternating with audio data segments.

In the following a detailed description will be given of an embodiment of a playback apparatus according to the present invention, and of a recording medium which can be utilized by the playback apparatus. In this embodiment, the recording medium is an optical recording disk from which audio data and video data expressing still pictures can be read out by the playback apparatus of the present invention in a basically similar manner to that of a prior art type of video CD which is used for recording audio data and still picture data, so that detailed description of the readout operation, optical readout head, etc., of the playback apparatus embodiment will be omitted. FIG. 1 is a system block diagram showing the general configuration of the playback apparatus embodiment, while FIG. 2 is a diagram showing the arrangement of the recorded audio data and still picture data on an optical recording disk which can be played by the playback apparatus embodiment. FIGS. 3 and 4 are diagrams for use in describing the operation of the playback apparatus when executing playback of audio signals and still picture signals from such an optical recording disk.

In the playback apparatus shown in FIG. 1, numeral 1 denotes a disk playback section which is made up of an optical recording disk drive mechanism, an optical readout head, a focus control and tracking control section, a signal processing section, an operating section, etc., as is well known in the prior art. A user of the playback apparatus can operate an input section 2a to generate an input command signal to specify a desired track on an optical recording disk that has been set on the optical recording disk drive mechanism. These input command signals are supplied to a playback control section 2b, which performs overall control of the operation of the playback apparatus. 3 is a changeover switch which is controlled by a signal from the playback control section 2b as described hereinafter, 5 is a still picture data memory, 6 is a still picture decoding and output section for decoding compression-encoded still picture data that are read out from the still picture data memory 5, and outputting a corresponding video signal, and 7 is an audio decoding and output section for decoding compression-encoded audio data of a selected track and outputting a corresponding audio signal.

Firstly, the manner of arrangement of data on an optical recording disk which can be played by the playback apparatus of FIG. 1 will be described, referring to the simple example of FIG. 2. In FIG. 2, TC1, TC2 and TC3 are respective sets of track control information corresponding to each of the tracks of the optical recording disk, with the track control information being recorded in a predetermined recording region of the optical recording disk which is assumed to be located at the inner periphery of the optical recording disk. Each set of track control information includes information which specifies, for the corresponding track, a group of still pictures (identified by a group number, with this embodiment) which include all of the still pictures that are to be displayed during playing of the audio data of that track, and also the boundaries of the region where the still picture data expressing that group are recorded on the optical recording disk.

The audio data are collectively recorded on a plurality of tracks within a single audio data recording region, i.e. in this simple example, on track 1, track 2 and track 3. In addition, as shown, all of the respective sets of still picture data corresponding to the groups of still pictures that are to be displayed during playing of the audio data of respective tracks are collectively recorded within a single still picture data recording region.

The numbers identifying the still picture groups are successively assigned, beginning from one end of the recording region in which the still picture groups are recorded on the optical recording disk. In this example, TC1 is the set of track control information corresponding to track 1, and it will be assumed that the contents of TC1 specify that the still picture group 1 corresponds to track 1 (i.e. that at least a specified part of the still pictures contained in that group are to be displayed during playback of the audio data of track 1). The still picture data sets numbered from 1 to 3 of still picture group 1 respectively express three still pictures, any of which may be designated by the contents of the track control information TC1 of track 1 to be displayed one or more times during playing of the audio data of track 1.

Similarly, it will be assumed that the track control information TC2 for track 2 designates the still picture group 2 (consisting of three still pictures numbered from 1 to 3) has been predetermined as corresponding to track 2, and that track control information TC2 for track 2 designates that still picture group 2 (consisting of five still pictures numbered from 1 to 5) corresponds to track 3.

It should be noted that with the present invention, even in the case in which only a single still picture corresponds to a track, that still picture is handled as a still picture group.

In the example of FIG. 2, the respective recording regions are arranged on the optical recording disk in the order: track control information recording region—still picture data recording region—track data recording region, i.e., with the track control information being recorded starting from the inner periphery of the optical recording disk and the track data recording region extending to the outer periphery of the disk. However it would be possible to utilize other types of arrangement of the data, such as: track control information recording region—track data recording region—still picture data recording region.

It should also be noted that although with the example of FIG. 2 the respective recording regions in which the sets of track control information TC1 to TC3 are recorded are formed at the inner periphery of the optical recording disk, it would be equally possible to record the track control information at the outer periphery of the optical recording disk.

FIG. 3 shows a simple example of the contents of a track control information set corresponding to a track, which could be for example be the contents of the track control information TC 1 in FIG. 2. In FIG. 3, respective sets of information constituting the "starting position of track" (i.e., the initial address, on the optical recording disk, of the region in which the audio data of the corresponding track are recorded), the "end position of track" (i.e., the final address, on the optical recording disk, of the region in which the audio data of the corresponding track are recorded), and "playing duration of track" are the same types of information as those which are recorded in the TOC (table of contents) of a prior art type of optical recording disk such as an audio CD. The remaining sets of information contained in the track control information set of FIG. 3 however are specific to the present invention, i.e. the "starting position of recorded still picture data expressing the still picture group corresponding to this track", the "end position of recorded still picture data expressing the still picture group corresponding to this track", the "number of the still picture group which corresponds to this track", and the "still picture display information", and these will be respectively described in the following.

The "starting position of recorded still picture data expressing the still picture group corresponding to this track" is the initial address, on the optical recording disk, of the region in which are recorded the data of a still picture group which has been predetermined as assigned to the corresponding track. This is a still picture group which includes all of the still pictures which are predetermined to be displayed during playback of that track. The "end position of recorded still picture data expressing the still picture group corresponding to this track" is the final address of the region in which the data of that still picture group are recorded on the optical recording disk.

Each of the positions, i.e. addresses on the optical recording disk, which are contained in the track control information information can be specified in terms of sector numbers for example.

The information "number of the still picture group which corresponds to this track" is a number which identifies the aforementioned still picture group that has been predetermined as assigned to this track. However it should be noted that the invention is not limited to the use of such numbers for identifying the still picture groups. It would be equally possible to simply use the information which specifies the range within which the data of a still picture group are recorded on the optical recording disk, i.e., the combination of "starting position of recorded still picture data expressing the still picture group corresponding to this track" and "end position of recorded still picture data expressing the still picture group corresponding to this track" to identify the still picture group that has been assigned to the track.

The remaining part of the track control information set in FIG. 3 is the "still picture display information", with an example of the contents thereof being shown. With this example, the "still picture display information" is arranged in the form of a table which indicates, for each still picture that is part of the specified still picture group and which is to be displayed during playback of the audio data of the corresponding track:

(a) a numeral which identifies that still picture,
(b) the "display starting time point" which is the time point (measured with respect to the start of playing the audio data of the corresponding track as a reference initial time point) at which displaying of that still picture is to begin, and
(c) the "starting position of recorded still picture data" and "end position of recorded still picture data" which specify the position of the data of that still picture within the data of that group of still pictures. When the data of a still picture group have been stored in the memory 5, that information can be used by the playback control section 2b to derive the range of memory addresses in which the data of that still picture have been stored in memory, within a range of memory addresses in which the entire data of that still picture group have been stored.

With the track control information example shown in FIG. 3, it can be understood that the still picture which is identified as picture 1 of group 1 is to be displayed twice during playing of the corresponding track, i.e. with the first period of display beginning at time point 10, and the second beginning at time point 100. Similarly, still picture 3 of group 1 is to be displayed twice during playing of that track, while still picture 2 of group 1 is to be displayed once during playing of this track.

Prior to the start of playback of any track of an optical recording disk, e.g., when an optical recording disk is set on the disk playback section 1 of the playback apparatus, the playback control section 2b automatically causes the optical readout head of the disk playback section 1 to be moved to the starting address of the track control information, and successively reads out the contents of the track control information sets TC1, TC2, TC3, which are then stored within the playback control section 2b. Since such operation is identical to that of a prior art type of optical recording disk playback apparatus such as a conventional audio CD player, detailed description will be omitted. With the present invention, the playback apparatus thereby obtains and registers (prior to the initiation of any playback operation) not only the start and end addresses of each track, but also information which identifies the still picture groups which have been preassigned to the respective tracks, and also the start and end addresses of the regions in which these still picture groups are respectively recorded on the optical recording disk.

The operation of the playback control section 2b of the playback apparatus embodiment shown in FIG. 1, operating on a recording medium consisting of an optical recording disk having the data configuration described above, will be described referring to FIG. 4. It will be assumed that with this embodiment, the processing flow shown in FIG. 4 is initiated when the user has set an optical recording disk on the disk drive section of the disk playback section 1 and has then used the input section 2a to input a command specifying that a particular track of that optical recording disk is to be played. The playback control section 2b then generates a control signal which causes the optical readout head of the disk playback section 1 to be moved to the start of the region on the optical recording disk in which the track control information information are recorded, and all of the track control information for each of the tracks is then read out and supplied to the playback control section 2b, to be registered in an internal memory (not shown in the drawings) of the playback control section 2b (step S1 in FIG. 4).

The playback control section 2b then scans the stored contents of the still picture data memory 5, judges whether valid still picture data for the optical recording disk that is to be played (i.e., data expressing still picture groups which are recorded on that disk) are already stored in that memory (step S2 in FIG. 4). If it is judged that such valid still picture data are already stored in the still picture data memory 5, then operation advances to step S3 in FIG. 4, while otherwise, the operation advances to step S4. (When playing of an optical recording disk is first started, there will of course not yet be any valid still picture data for that optical recording disk stored in the still picture data memory 5.)

In step S3, a decision is made as to whether the data of the still picture group which is specified for the selected track in the track control information of that track are already stored in the still picture data memory 5. This judgement can for example be based on the aforementioned group numbers used to identify the respective still picture groups, i.e., by comparing the group number specified in the track control information of the selected track with the group numbers of any still picture groups which have already been stored in the still picture data memory 5. Alternatively, such judgement could be based on the respective ranges in which the respectively data sets of the still picture groups are recorded on the optical recording disk, if such ranges are utilized to identify the still picture groups as described hereinabove.

If it is judged in step S3 that data expressing the still picture group corresponding to the selected track have already been stored in the still picture data memory 5, then operation advances to step S8, while otherwise, operation advances to step S4.

In step S4, the playback control section 2b generates a control signal whereby the changeover switch 3 is set in the condition for supplying the output data from the disk playback section 1 to the still picture data memory 5. After the playback control section 2b has moved the optical readout head of the disk playback section 1 to the starting position of the recording region in which are recorded the data of the still picture group that is specified in the track control information of the selected track (step S5), the still picture data of that group are read out by the optical readout head and are supplied via the changeover switch 3 to the still picture data memory 5, to be stored therein (step 6 in FIG. 4). Information identifying that still picture group, such as the group number (or range in which the data of that group are recorded on the disk, as described above) is also stored in the still picture data memory 5 at that time.

After the specified still picture data have thus been stored in the still picture data memory 5, the playback control section 2b supplies a control signal to the changeover switch 3 whereby switch 3 is set in the condition for supplying the output data from the disk playback section 1 to the audio decoding and output section 7 (step S7 in FIG. 4), and operation then advances to step S8. In step S8, the playback control section 2b moves the optical readout head of the disk playback section 1 to the starting position of the recording region containing the track that is to be played, then the audio data of the specified track begin to be read out by the optical readout head and supplied via the changeover switch 3 to the audio decoding and output section 7 to be decoded and output, with the resultant audio signal being supplied to the output terminal 9 (step S9).

During the interval of playing this playback audio signal, in step S10, the playback control section 2b judges whether a time point has been reached that is specified (by the still picture display information of the track control information of the track which is being played) for starting display of a particular still picture of the still picture group which is assigned to that track (step S10). If it is judged that such a time point has been reached, then the data of the specified still picture are read out from the still picture data memory 5 and supplied to the still picture decoding and output section 6, to be decoded to obtain a video signal expressing the still picture, which is supplied to the output terminal 8 (step S11).

If it is then judged in step S12 that the end of playback of the selected track has not yet been been reached, operation returns to step S10, to wait for the next attainment of a still picture display time point that is specified in the still picture display information of the track control information of that track.

In that way, each of the still pictures of the still picture group assigned to that track starts to be displayed at a time point specified in the still picture display information of the track control information of the track, with each still picture being displayed by a number of times that is specified in the still picture display information, but without the need to record the data of a still picture a plurality of times on the optical recording disk.

Furthermore, it will be apparent that the present invention enables a still picture (or a specific plurality of still pictures) to be displayed during playing of each of a number of different tracks, without the need for recording multiple copies of the still picture data on the recording medium. This will be explained referring again to FIGS. 2 and 3. In the above description of FIG. 2, it is assumed that the set of three still pictures assigned to track 1 is different from the three still pictures which are specified for track 2, and that neither of the sets of still pictures specified for tracks 1 or 2 is included within the set of five still pictures which are specified for track 3. In such a case, three different data sets are recorded in the still picture data recording region of the optical recording disk, respectively expressing the still picture groups 1, 2 and 3, as shown in FIG. 2. However if for example the three still pictures which are specified for track 1 were identical to three of the five still pictures which are specified for track 3, then the same still picture group could be specified for both track 1 and track 3, in their respective sets of track control information information. In that case, it would only be necessary to record the data of two still picture groups in the still picture data recording region, since the still picture group for track 3 would satisfy the condition of including all of the still pictures which are specified for display during playback of track 1.

As will be clear from the detailed description given above, a playback apparatus and recording medium for audio data and still picture data can substantially overcome the problems of the prior art. When playback of the recording medium begins to be performed and playing of the audio data of a selected track is designated, data of a still picture group which includes all of the still pictures which are to be displayed during playing of that track are read out from the recording medium and stored in memory, to be thereafter read out from memory and converted to a video signal at each of appropriate time points which are specified in the track control information for that track. Thereafter, if that same track is again designated to be played, or if playing of the audio data of some other track for which all of the corresponding specified still pictures are included in the aforementioned still picture group is subsequently designated, the still picture data which have already been stored in memory are utilized, without the need to read out still picture data from the recording medium.

That is to say, if it is required to display a set of one or more still pictures which are included within a particular still picture group, during playing of each of a plurality of tracks, it is only necessary to specify that single still picture group as corresponding to each of that plurality of tracks, i.e. to identify that still picture group in each of the track control information sets of these tracks.

Furthermore, if the same still picture is specified to be displayed a plurality of times during playing of a particular track, then it is only necessary to specify such multiple display operation in the track control information of that track. In that case, a single set of data expressing that still picture will be read out from memory at each of the time points which are specified for displaying the still picture. It is therefore made unnecessary to record the data of such a still picture at a plurality of different positions on the recording medium, as is required in the prior art.

For the above reasons, the present invention enables the proportion of the overall recording capacity available for recording of audio data on such a recording medium to be substantially increased, by eliminating the amount of capacity which must be devoted to recording multiple copies of the data of certain still pictures.

Furthermore, after playback of a selected track has been completed, the still picture data of the still picture group corresponding to that track will remain stored in the still picture data memory. Thus if it is thereafter judged that the still picture group corresponding to any track of that recording medium which is subsequently selected to be played (i.e. as specified in the track control information of that track) is identical to a still picture group which is already held stored in the still picture data memory, it is unnecessary to read out the data of that still picture group from the recording medium. In that way, unnecessary storage of data in the still picture data memory can be eliminated, and periods of discontinuity between audio playback from successively selected tracks can be reduced.

Hence, the proportion of the overall recording capacity available on such a recording medium for recording of audio data can be substantially increased, by reducing the amount of capacity which must be devoted to recording multiple copies of the data of certain still pictures.

Furthermore with a recording medium according to the present invention, if it should become necessary during the production of such a recording medium to alter the arrangement of still picture data on the recording medium or to delete any of the still picture data, after layout of data on the recording medium has been completed, such rearrangement or deletion of data can easily be performed.

Thus, the present invention can substantially overcome the problems of the prior art.

What is claimed is:

1. A playback apparatus for executing playback of an optical recording medium having an audio data recording region formed with a plurality of tracks having respective sets of audio data recorded therein, a still picture data recording region having sets of data recorded therein which express respective ones of a plurality of still pictures, and a track control information recording region having recorded therein respective sets of track control information for each of said tracks, said still picture data recording region having said still picture data recorded as a plurality of still picture groups with each of said groups formed of data of one or more still pictures, said still picture groups being recorded consecutively in units of groups within said still picture data recording region, and with data of respective still pictures of a group being recorded consecutively in units of still pictures, wherein said track control information corresponding to a specific track includes information which specifies a still picture group which is to be linked to playback of the audio data of said track, information which designates respective still picture data sets of said group, and information which specifies respective display timings for said still picture data sets of said group;

said apparatus comprising
   a still picture data memory,
   control means, operating when playback of the audio data of a selected one of said tracks is specified, for utilizing said track control information corresponding to said selected track to store in said still picture data memory the respective still picture data of a group which is linked to said selected track,
   means for initiating playback of said audio data of said selected track after completion of storing said data expressing said still picture group corresponding to said selected track in said still picture data memory, and
   means for utilizing said track control information of said selected track to obtain a combination of information including information for specifying data of a still picture which is within the still picture group corresponding to said selected track, and information for specifying a display timing corresponding to said specified still picture data, and for using said combination of information for reading out said still picture data from said still picture data memory and for initiating display of said still picture data at a timing which is based on said specified display timing.

2. A playback apparatus according to claim 1, further comprising control means whereby, following termination of an operation of playback of said audio data of a selected one of said tracks, data of said still picture group corresponding to said selected track are held stored in said still picture data memory, and whereby when it is judged that a still picture group which is linked, in said track control information, to a succeeding track for which audio signal playback is to be executed is identical to said still picture group whose data are held stored in said still picture data memory, no operation is performed for storing said still picture group corresponding to said succeeding track in said still picture data memory.

3. An optical recording medium having an audio data recording region formed with a plurality of tracks having respective sets of audio data recorded therein, a still picture data recording region having sets of data recorded therein which express respective ones of a plurality of still pictures, and a track control information recording region having recorded therein respective sets of track control information for each of said tracks, said still picture data recording region having said still picture data recorded as a plurality of still picture groups with each of said groups formed of data of one or more still pictures, said still picture groups being recorded consecutively in units of groups within said still picture data recording region, and with data of respective still pictures of a group being recorded consecutively in units of still pictures;

wherein each set of said track control information corresponding to a specific track comprises a combination of information which specifies the recording start position of a still picture group which is to be linked to playback of the audio data of said track, for thereby designating said still picture group, information specifying respective recording start positions, within said still picture group, of said one or more still pictures of said still picture group, and information specifying respective display timings for said one or more still pictures of said still picture group.

* * * * *